United States Patent
Sun

(10) Patent No.: US 10,250,825 B2
(45) Date of Patent: Apr. 2, 2019

(54) NIGHT VISION DEVICE WITH PERIODIC INFRARED ILLUMINATION AND GLOBAL SHUTTER CMOS SENSOR

(71) Applicant: Ambarella Shanghai Co., Ltd., Shanghai (CN)

(72) Inventor: Luyi Sun, Shanghai (CN)

(73) Assignee: Ambarella, Inc., Santa Clara, CA (US)

( * ) Notice: Subject to any disclaimer, the term of this patent is extended or adjusted under 35 U.S.C. 154(b) by 621 days.

(21) Appl. No.: 14/929,673

(22) Filed: Nov. 2, 2015

(65) Prior Publication Data

US 2017/0104939 A1 Apr. 13, 2017

(30) Foreign Application Priority Data

Oct. 10, 2015 (CN) .......................... 2015 1 0651939

(51) Int. Cl.
| | |
|---|---|
| *H04N 5/353* | (2011.01) |
| *H04N 5/33* | (2006.01) |
| *H04N 5/374* | (2011.01) |
| *H04N 5/378* | (2011.01) |
| *H04N 7/18* | (2006.01) |
| *H04N 5/225* | (2006.01) |
| *H04N 5/235* | (2006.01) |

(52) U.S. Cl.
CPC .......... *H04N 5/353* (2013.01); *H04N 5/2256* (2013.01); *H04N 5/2354* (2013.01); *H04N 5/33* (2013.01); *H04N 5/374* (2013.01); *H04N 5/378* (2013.01); *H04N 7/183* (2013.01)

(58) Field of Classification Search
CPC .......... H04N 5/353; H04N 5/374; H04N 5/33; H04N 5/378; H04N 7/183
See application file for complete search history.

(56) References Cited

U.S. PATENT DOCUMENTS

| | | | |
|---|---|---|---|
| 2010/0020209 A1* | 1/2010 | Kim | H04N 3/155 348/294 |
| 2017/0244934 A1* | 8/2017 | Chien | H04N 7/181 |

FOREIGN PATENT DOCUMENTS

| | | | | |
|---|---|---|---|---|
| CN | 102324014 A | 1/2012 | ............. | G06K 7/10 |
| CN | 103149775 A | 6/2013 | ............. | G03B 15/03 |
| CN | 104700622 A | 6/2015 | ............. | G08G 1/017 |
| GB | 2459506 | 4/2008 | ............. | H04N 5/235 |
| GB | 2459506 A | * 10/2009 | ........... | H04N 5/2354 |
| JP | 2007116394 A | 5/2007 | ............. | H04N 5/335 |
| JP | 2007155428 A | 6/2007 | ............. | G01C 21/00 |
| JP | 2008157880 A | 7/2008 | ............. | G01C 21/00 |

\* cited by examiner

*Primary Examiner* — Shawn S An

(74) *Attorney, Agent, or Firm* — Christopher P. Maiorana, PC

(57) ABSTRACT

An apparatus includes a complementary metal oxide semiconductor (CMOS) image sensor, an infrared light generating circuit, and a processor circuit. The CMOS image sensor includes a plurality of picture elements, where light integration begins on all of the picture elements simultaneously in response to a first control signal. A duration, an intensity, or both a duration and an intensity of infrared illumination produced by the infrared light generating circuit is controlled by a second control signal. The processor circuit is enabled to generate the first control signal and the second control signal. A period of the infrared illumination is shorter than an integration period of the CMOS image sensor.

20 Claims, 13 Drawing Sheets

NIGHT VISION DEVICE WITH PERIODIC INFRARED ILLUMINATION AND GLOBAL SHUTTER CMOS SENSOR

This application relates to Chinese Application No. 201510651939.9, filed Oct. 10, 2015, which is incorporated by reference in its entirety.

FIELD OF THE INVENTION

The present invention relates to digital cameras generally and, more particularly, to a night vision device with periodic infrared illumination and a global shutter CMOS sensor.

BACKGROUND OF THE INVENTION

Digital cameras used to recognize objects around a moving vehicle need to capture precise shape and details of a high-speed moving subject. Existing complementary metal oxide semiconductor (CMOS) image sensors have a rolling shutter as an electronic shutter function and, therefore, unavoidably incur focal plane distortion when imaging moving objects. The focal plane distortion can be exacerbated in low light conditions, where longer exposure times are necessary. Providing higher ambient light levels through continuous illumination can waste power, thus shortening battery life.

It would be desirable to implement a night vision device with periodic infrared illumination and a global shutter CMOS sensor.

SUMMARY OF THE INVENTION

The present invention encompasses an aspect concerning an apparatus including a complementary metal oxide semiconductor (CMOS) image sensor, an infrared light generating circuit, and a processor circuit. The CMOS image sensor includes a plurality of picture elements, where light integration begins on all of the picture elements simultaneously in response to a first control signal. A duration, an intensity, or both a duration and an intensity of infrared illumination produced by the infrared light generating circuit is controlled by a second control signal. The processor circuit is enabled to generate the first control signal and the second control signal. A period of the infrared illumination is shorter than an integration period of the CMOS image sensor.

In some embodiments of the apparatus aspect described above, the plurality of picture elements of the CMOS image sensor are arranged in a two-dimensional array.

In some embodiments of the apparatus aspect described above, the plurality of picture elements of the CMOS image sensor are reset simultaneously in response to the first control signal.

In some embodiments of the apparatus aspect described above, the CMOS image sensor comprises a global shutter CMOS image sensor.

In some embodiments of the apparatus aspect described above, the second control signal determines an infrared light emitting window of the infrared light generating circuit.

In some embodiments of the apparatus aspect described above, the infrared light generating circuit comprises a plurality of light emitting diodes. In some embodiments implementing the plurality of light emitting diodes, the second control signal may also determine how many of the light emitting diodes are turned on during the infrared light emitting window.

In some embodiments of the apparatus aspect described above, the processor circuit is further configured to determine an ambient light level. In some embodiments where the processor circuit is configured to determine the ambient light level, the processor circuit is further configured to generate the second control signal based on the determined ambient light level.

In some embodiments of the apparatus aspect described above, the processor circuit is further configured to start an integration period of the CMOS image sensor by asserting the first control signal, generate a pulsed infrared illumination using the second control signal, readout image data from the CMOS image sensor when the integration period of the CMOS image sensor ends, and detect one or more objects contained in the image data by applying one or more image processing techniques to the image data.

In some embodiments of the apparatus aspect described above, the processor circuit is further configured to reduce motion-related distortion of image data by adjusting a duration of the pulsed infrared illumination based on an ambient light level.

In some embodiments of the apparatus aspect described above, the CMOS image sensor, the infrared light generating circuit, and the processor circuit implement a video camera. In some embodiments implementing a video camera, the video camera may have night vision capability and is mountable in a vehicle.

The present invention also encompasses an aspect concerning a method of capturing video images in low ambient light comprising the steps of starting an integration period of a CMOS image sensor by asserting a first control signal, generating a pulsed infrared illumination using a second control signal to pulse one or more of a plurality of light emitting diodes during an integration period of the CMOS image sensor, and reading out image data from said CMOS image sensor when said integration period of said CMOS image sensor ends. The CMOS image sensor comprises a plurality of picture elements and light integration begins on all of the picture elements simultaneously in response to the first control signal. A duration, an intensity, or both a duration and an intensity of the pulsed infrared illumination is controlled by the second control signal.

In some embodiments of the method aspect described above, the method further comprises detecting one or more objects contained in the image data by applying one or more image processing techniques to the image data using at least one of a video digital signal processing circuit and an image digital processing circuit.

In some embodiments of the method aspect described above, the plurality of picture elements of the CMOS image sensor are arranged in a two-dimensional array.

In some embodiments of the method aspect described above, the plurality of picture elements of the CMOS image sensor are reset simultaneously in response to the first control signal.

In some embodiments of the method aspect described above, the CMOS image sensor comprises a global shutter CMOS image sensor.

In some embodiments of the method aspect described above, the second control signal determines an infrared light emitting window of an infrared light generating circuit comprising the plurality of light emitting diodes. In some embodiments where the second control signal determines an infrared light emitting window of an infrared light generating circuit, the second control signal may also determine how many of the light emitting diodes are turned on during the infrared light emitting window.

In some embodiments of the method aspect described above, the method further comprises determining an ambient light level. In some embodiments where the ambient light level is determined, the second control signal is generated based on the determined ambient light level.

In some embodiments of the method aspect described above, a duration of the pulsed infrared illumination is adjusted based on an ambient light level to reduce motion-related distortion of image data.

The objects, features and advantages of the present invention include providing a night vision device with periodic infrared illumination and a global shutter CMOS sensor that may (i) pulse infrared (IR) light emitting diodes (LEDs) to provide the infrared illumination, (ii) synchronize an infrared illumination window to an exposure window of the global shutter CMOS sensor, (iii) ensure correct lighting is provided for a particular application, (iv) vary a pulse width of the infrared illumination window based upon ambient light levels, (v) improve IR LED efficiency, (vi) use less power, (vii) reduce instances of overheating, (viii) reduce motion blur in each frame, and/or (ix) be implemented using one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

In various embodiments, a night vision functionality is illustrated implemented in a camera comprising a global shutter CMOS (complementary metal oxide semiconductor) sensor and enabled to provide periodic infrared illumination. As used herein, the term infrared (IR) generally encompasses both near-infrared (e.g., ~700 nm-~1000 nm) and longer (e.g., mid- and far-infrared) wavelength light. When a trigger event is detected, the global shutter CMOS sensor may be activated (e.g., to begin an exposure/integration cycle) and illumination provided by pulsing an infrared light source for a determined period of time within an exposure/integration window of the global shutter CMOS sensor. By using a global shutter CMOS sensor and pulsed infrared illumination, improved low light/night vision images may be obtained. The infrared illumination window is generally synchronized to the exposure/integration window of the global shutter CMOS sensor to provide correct lighting for a particular application. In various embodiments, the pulse width of the infrared illumination window may be varied based upon ambient light levels. Pulsing infrared (IR) light emitting diodes (LEDs) to provide the infrared illumination, rather than having the infrared illumination continuously on, may improve IR LED efficiency, use less power, and reduce instances of overheating. A short pulse width may be used to freeze motion, thus reducing motion blur in each frame. In various embodiments, cameras in accordance with embodiments of the invention may be utilized for capturing traffic video, in an automated driver assistance system (ADAS), and/or image detection/recognition applications.

Figure 1:
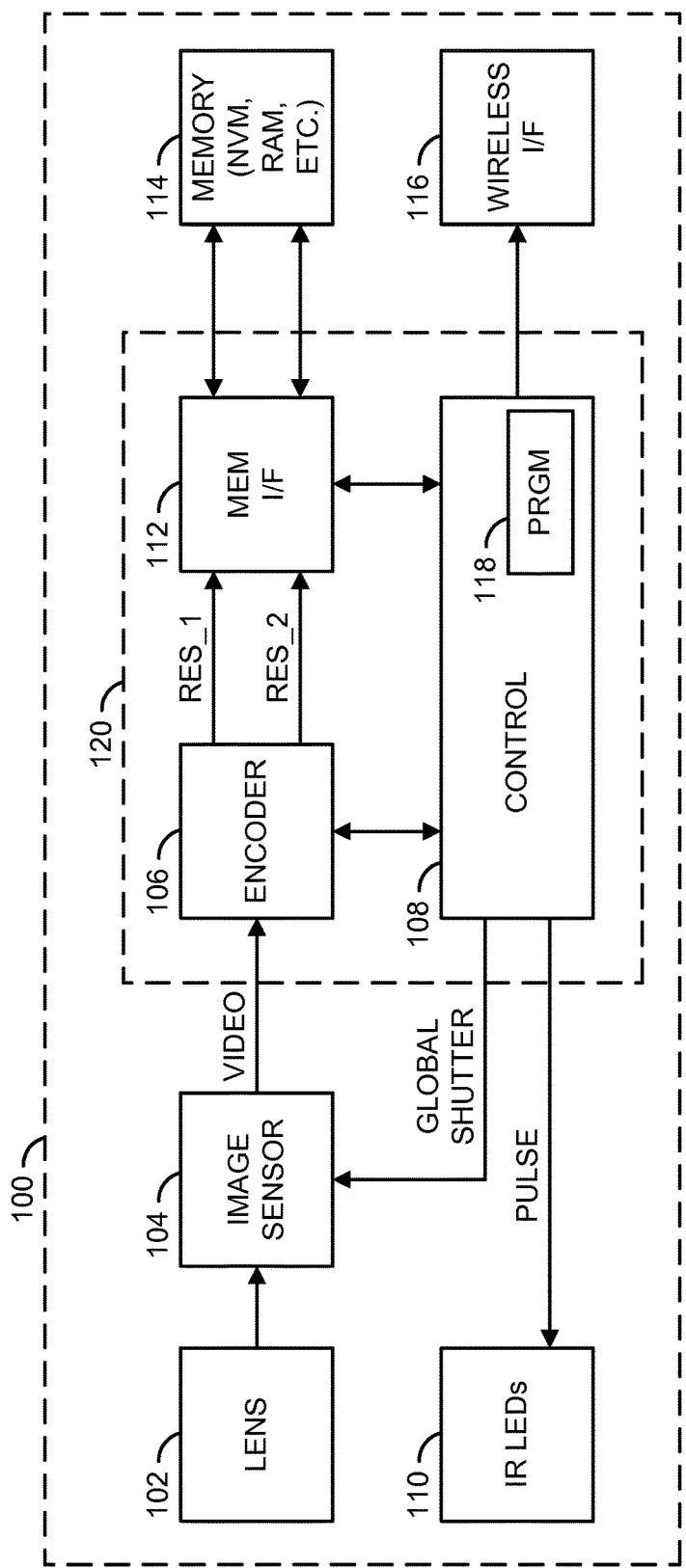
FIG. 1 is a schematic diagram illustrating a camera circuit in accordance with an example embodiment of the invention.

Referring to FIG. 1, a block diagram of a device 100 is shown illustrating a video camera/recorder system in accordance with an example embodiment of the present invention. In one example, the device (or apparatus) 100 may comprise a block (or circuit) 102, a block (or circuit) 104, a block (or circuit) 106, a block (or circuit) 108, a block (or circuit) 110, a block (or circuit) 112, a block (or circuit) 114, and a block (or circuit) 116. The blocks 106, 108, 112, 114, and 116 may be implemented in hardware, software, firmware, or any combination thereof, and in one or multiple apparatuses (or devices).

In various embodiments, the device 100 may be implemented as a high-resolution (or high-definition) video camera/recorder. The device 100 may be operational to capture one or more video and/or audio streams (or clips) and collect various types of sensor information (data). In some embodiments, the device 100 may be operational to capture one or more high-bitrate (e.g., high resolution, etc.) video streams (or clips), corresponding lower bitrate (e.g., lower resolution, lower frame rate, higher predicted frames to reference frame ratio, altered quantization parameters, etc.) video streams (or clips), audio streams (or clips), and/or collect motion and position information. Low light/night vision video streams may be captured using the block 102 (e.g., a lens and associated actuator(s)), the block 104 (e.g., a global shutter complementary metal oxide semi-conductor (CMOS) electro-optical sensor), and the block 110 (e.g., an infrared light generating circuit). In various embodiments, the block 110 may be implemented using a number of infrared (IR) light emitting diodes (LEDs). A high-bitrate video stream (e.g., RES_1) and/or one or more low bitrate video streams (e.g., RES_2) may be generated (e.g., processed, encoded, compressed, etc.) by the block 106 (e.g., an encoder). The block 106 may be operational to generate, process, and encode the video streams RES_1 and RES_2 using one or more proprietary and/or standard still and/or video codecs (e.g., JPEG, MJPEG, MPEG-2, MPEG-4, H.264, HEVC, etc.).

The low-bitrate video clips may contain the same content captured at the same time from the same point of view as the corresponding high-bitrate video clips. In some embodiments, the low-bitrate video clips may be a downscaled copy of the high-bitrate video clips. In other embodiments, the low-bitrate video clips and the high-bitrate video clips may be captured in parallel. For example, each frame captured by the block 106 may be processed as high-bitrate video and processed as downscaled low-bitrate video. In some embodiments, the low-bitrate video stream may be generated from the high-bitrate video stream through transcoding. In some embodiments, the higher bitrate stream may be decoded and then re-encoded into the lower bitrate stream.

The block 108 (e.g., a control circuit) may be configured to manage the block 104, the block 106, the block 110, and the block 112 (e.g., a memory interface) to store the video streams RES_1 and RES_2 in the block 114 (e.g., a memory). The block 114 may be implemented using various volatile (e.g., SRAM, DRAM, etc.) and/or non-volatile (e.g., flash, SD-card, xD-picture card, subscriber identity module (SIM) card, etc.) memory technologies. The block 108 may be further configured to communicate (e.g., transfer) at least a portion (e.g., a video stream, one or more short video clips, one or more still pictures, an audio stream, one or more audio clips, etc.) of high-res video data, low-bitrate video data, and/or audio data stored in the block 114 to an external device (e.g., a user device) via the block 116 (e.g., a wireless communication interface). For example, in various embodiments the block 116 may be configured to support one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee®. In some embodiments, the block 116 may also implement one or more protocols (e.g., GSM, CDMA, GPRS, UMTS, CDMA2000, 3GPP LTE, 4G/HSPA/WiMAX, SMS, etc.) associated with cellular communication networks.

In various embodiments, the block 108 may include programming code 118 (e.g., microcode, firmware, software, etc.) for controlling/directing operation of the block 108 and/or sub-circuits of the block 108. The programming code 118 may configure the block 108 to implement a method in accordance with an embodiment of the invention. For example, the programming code 118 may direct the block 108 in capturing and processing a video data signal (e.g., VIDEO) from the block 104, generating a signal (e.g., GLOBAL SHUTTER) and a signal (e.g., PULSE), and interacting with the blocks 112, 114, and 116. The signal GLOBAL SHUTTER may implement one or more control signals for controlling the image sensor 104. In various embodiments, the signal GLOBAL SHUTTER may comprise a global shutter control signal or signals for controlling an exposure window of the block 104. The signal GLOBAL SHUTTER may also comprise various signals (e.g., vertical sync, horizontal sync, etc.) for controlling video-related operations of the image sensor 104. The signal PULSE may implement a control signal for controlling an infrared light pulse within an infrared light emitting window. In various embodiments, the signal PULSE may control a width of the infrared emitting window and/or an amplitude of the infrared illumination (e.g., varying a number of infrared (IR) light emitting diodes (LEDs) used to generate the infrared illumination). In some embodiments, the blocks 106, 108, and 112 may be implemented together as a single integrated circuit 120 (e.g., a processor/camera chip or System on Chip (SoC)).

In some embodiments, the device 100 is implemented as a low light/night vision camera including wireless (e.g., WiFi, Bluetooth®, ZigBee®, etc.) connectivity. The addition of WiFi, ZigBee®, Bluetooth® and/or cellular wireless connectivity into the device 100 allows the device 100 to send video images, still images, audio clips, and/or other collected data wirelessly to a remote location (e.g., a user device, the Internet, a secure server, a cloud computer, a security service, a police department, an emergency responder, and/or other predetermined recipient). In one example, bandwidth may be reduced by uploading post-processed data instead of entire video sequences (or clips). In one example, the device 100 may implement one or more protocols (e.g., GSM, CDMA, GPRS, UMTS, CDMA2000, 3GPP LTE, 4G/HSPA/WiMAX, SMS, etc.) associated with cellular telephone networks. By uploading the video clips, still images, audio clips, and/or collected (or post-processed) data to the Internet/Cloud, the data may be preserved.

Figure 2:
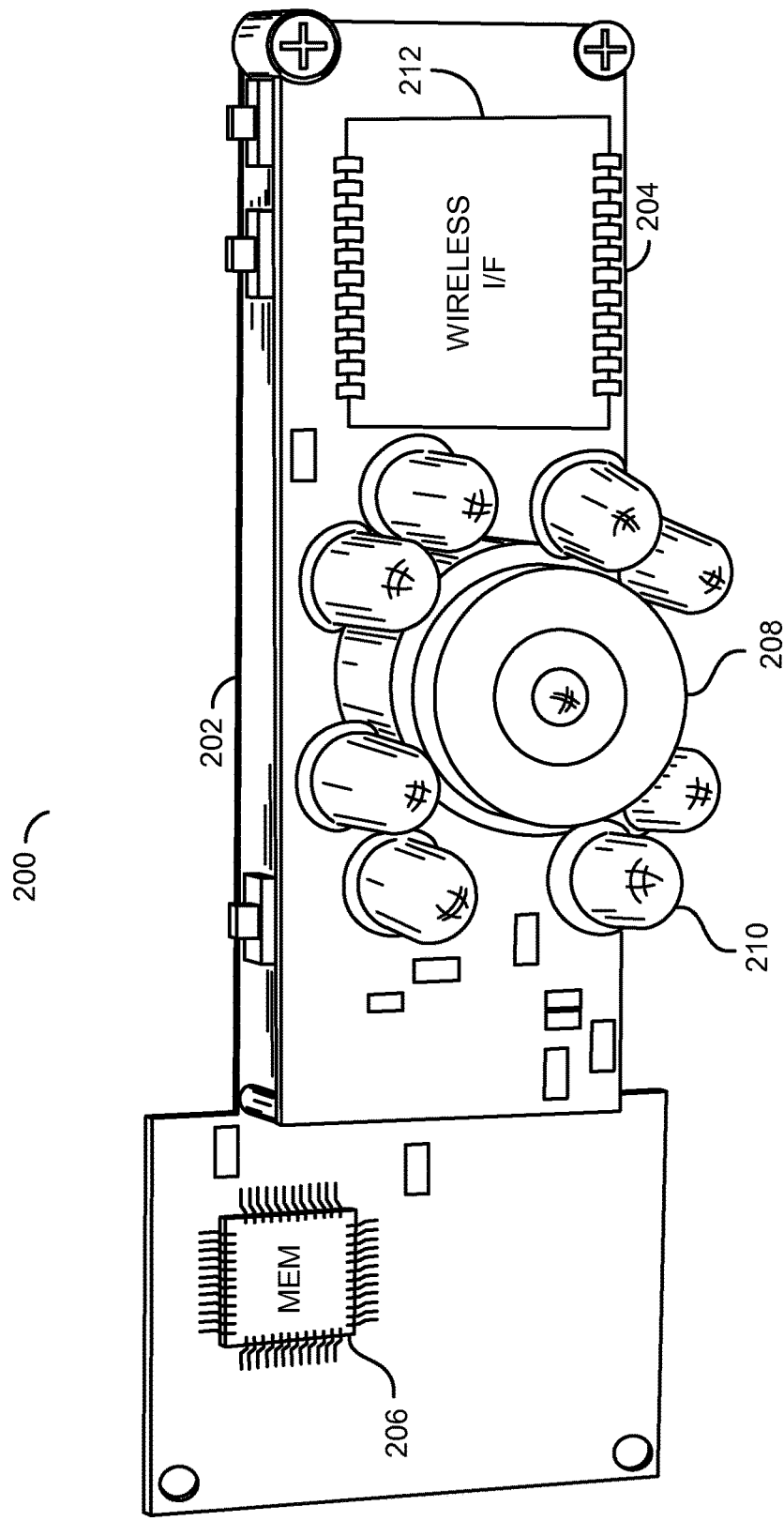
FIG. 2 is a diagram illustrating an example implementation of the camera of FIG. 1.

Referring to FIG. 2, a diagram is shown illustrating an example implementation of a night vision camera 200 in accordance with an embodiment of the invention. In various embodiments, the camera 200 may comprise a first printed circuit board 202 and a second printed circuit board 204. The printed circuit boards 202 and 204 may be mounted together. The printed circuit board 202 may include a memory circuit (or chip) 206, a processor circuit and a global shutter CMOS sensor (obscured by printed circuit board 204). The printed circuit board 204 may include a lens 208, a number of IR LEDs 210, and a wireless interface circuit (or module) 212. In one example, the wireless interface 212 may comprise a pre-certified wireless/cellular protocol module.

Figure 3:
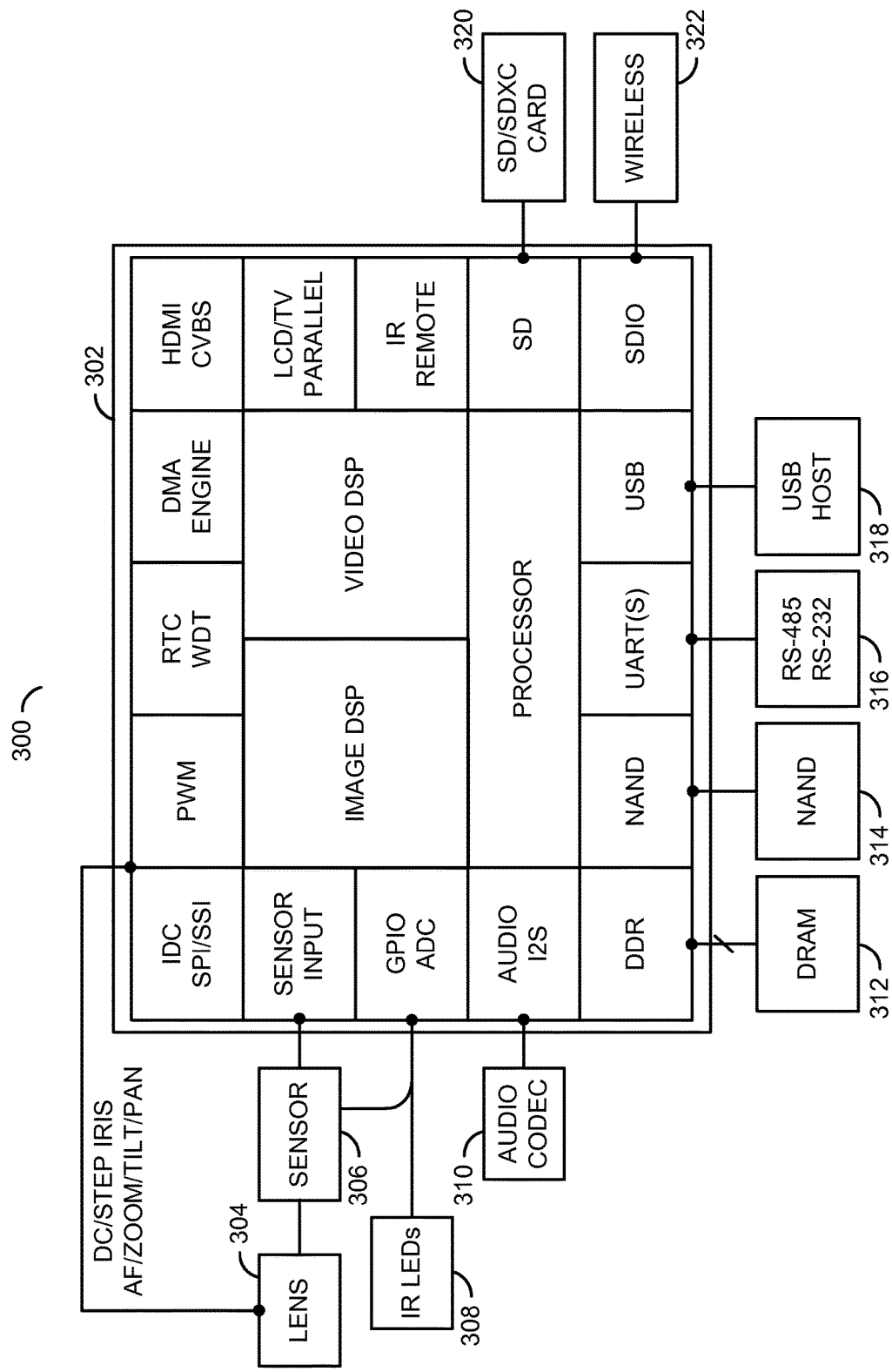
FIG. 3 is a diagram illustrating an example implementation of a processor circuit of FIG. 1.

Referring to FIG. 3, a block diagram of a camera system 300 is shown illustrating an example implementation of a camera/recorder system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300. In one example, the camera system 300 may comprise a processor/camera chip (or circuit) 302, a lens assembly 304, a global shutter CMOS image sensor 306, a number of infrared (IR) light emitting diodes (LEDs) 308, an optional audio codec 310, dynamic random access memory (DRAM) 312, non-volatile memory (e.g., NAND flash memory) 314, one or more serial interfaces 316, an interface 318 for connecting to or acting as a USB host, an interface for connecting to a removable media 320 (e.g., SD, SDXC, etc.), and a wireless interface 322 for communicating with one or more remote devices.

The processor/camera circuit 302 may include a number of modules including a pulse width modulation (PWM) module, a real time clock and watch dog timer (RTC/WDT), a direct memory access (DMA) engine, a high-definition multimedia interface (HDMI), an LCD/TV/Parallel interface, a general purpose input/output (GPIO) and analog-to-digital converter (ADC) module, an infrared (IR) remote interface, a secure digital input/output (SDIO) interface, an SD card interface, an audio I²S interface, an image sensor interface, and a synchronous data communications interface (e.g., IDC SPI/SSI). The circuit 302 may also include an embedded processor (e.g., ARM, etc.), an image digital signal processor (DSP) and a video DSP. The circuit 302 may be configured (e.g., programmed) to control the lens assembly 304, the global shutter CMOS sensor 306, and a pulse duration of the IR LEDs 308. The circuit 302 may receive image data from the sensor 306. The wireless interface 322 may include support for wireless communication by one or more wireless and/or cellular protocols such as Bluetooth, ZigBee, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The circuit 302 may also include support for communicating using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

Figure 4:
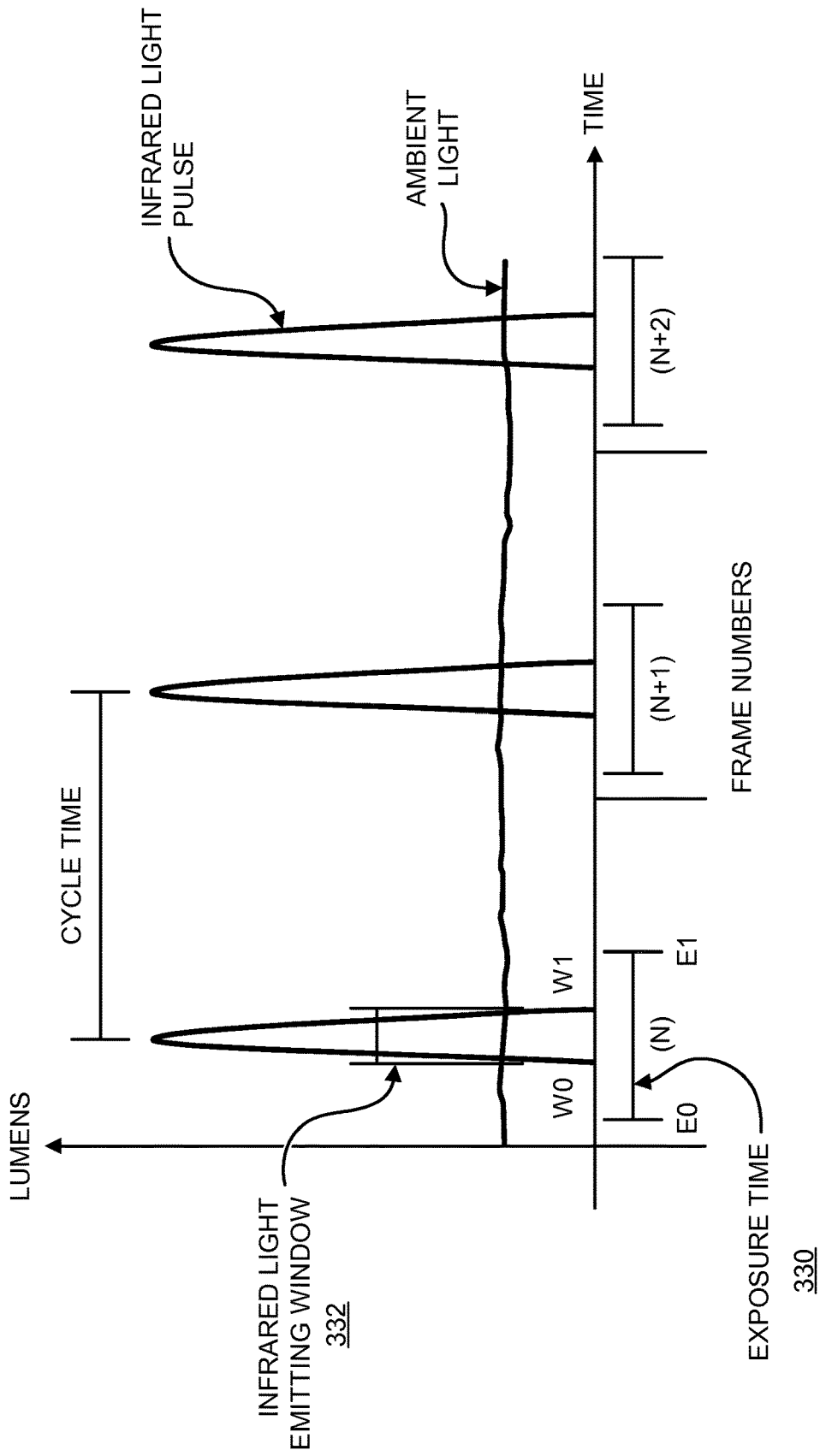
FIG. 4 is a diagram illustrating an example operation of a camera in accordance with an example embodiment of the invention.

Referring to FIG. 4, a diagram is shown illustrating an example operation of a camera in accordance with an embodiment of the invention. In various embodiments, the night vision camera 100 and/or 300 may generate a sequence of images (or frames or pictures) over a period of time. Each frame (e.g., N, NA−1, N+2, etc.) is taken during a period of time referred to herein as a cycle time. The cycle time determines how many frames per unit time (e.g., seconds, etc.) the sequence contains. During each cycle, an exposure window 330 starts at a time E0 and ends at a time E1. For example, at time E0 the global shutter CMOS sensor 104 and/or 306 is initialized to start capturing/integrating image data. At time E1, the global shutter CMOS sensor 104 and/or 306 is controlled to stop the exposure (e.g., image data is transferred from collecting elements of the global shutter CMOS sensor 104 and/or 306 to storage elements (e.g., analog memory) of the global shutter CMOS sensor 104 and/or 306). An infrared light emitting window 332 starts at a time W0 and ends at a time W1. The infrared light emitting window 332 is generally shorter than the exposure window 330 (e.g., W0−W1<E0−E1), ensuring an infrared light pulse may be located within each exposure window 330. The infrared light emitting window 332 is generally synchronized with the exposure window 330. For example, the start of the infrared light emitting window 332 (e.g., W0) may be synchronized to occur a predetermined amount of time after the start of the exposure window 330 (e.g., E0). In general, the infrared illumination is not on during the periods prior to or following the exposure window 330. Infrared illumination provided outside the exposure window 330 does not contribute to exposure of the CMOS sensor and, therefore, wastes energy (e.g., producing heat and/or reducing battery life without providing any benefit).

Within each infrared light emitting window 332, one or more infrared light pulses may be generated. In various embodiments, the infrared light pulse is generated with an amplitude greater than an ambient light level. In general, stop motion photography may be obtained by setting the amplitude and duration of the infrared light pulse to provide the majority of light collected by the global shutter CMOS sensor. Strong intensity and short time lapse infrared illumination produces a "freeze motion" effect. A moving object will be lit by the infrared illumination for a short time. Even though the moving object will still be lit by the ambient light during the exposure window 330, due to the strong intensity of infrared illumination, the infrared illumination provides most of the exposure of the CMOS sensor. The short duration of the infrared illumination reduces the appearance of the actual motion of the moving object on the CMOS sensor.

Figure 5:
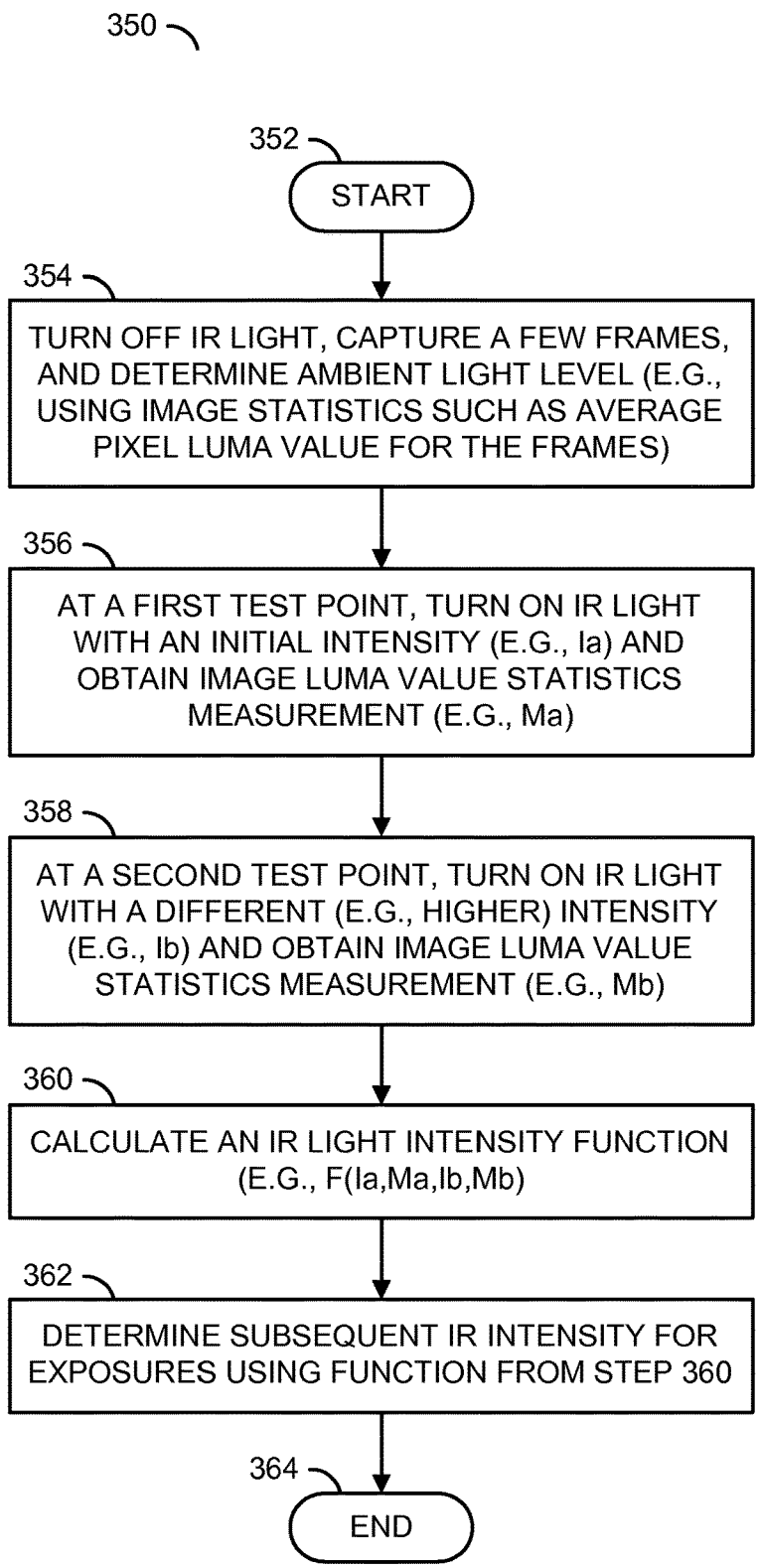
FIG. 5 is a flow diagram illustrating a process in accordance with an example embodiment of the invention.

Referring to FIG. 5, a flow diagram illustrating an infrared light intensity setting process in accordance with an example embodiment of the invention is shown. The ambient light level can be measured periodically in order to control the infrared light intensity. The measurement of the ambient light level can be done by turning off the infrared light, capturing a few frames, and then generating image statistics (e.g., an average pixel luminance value of each frame, etc.) for the captured video frames using a digital signal processor (DSP). The DSP can determine the intensity of ambient light based on the image statistics. The DSP may also be used to periodically determine the intensity of the infrared illumination.

In various embodiments, a process (or method) 350 for determining the infrared illumination intensity may comprise a step (or state) 352, a step (or state) 354, a step (or state) 356, a step (or state) 358, a step (or state) 360, a step (or state) 362, and a step (or state) 364. The process 350 starts at the step 352 and moves to the step 354. In the step 354, the infrared light is turned off, a number of frames are captured, and a determination of the ambient light level is made. For example, the ambient light level may be determined using image statistics such as average pixel luminance (luma) values of the frames captured while the infrared light was turned off.

In the step 356, a first exposure measurement (e.g., Ma) is made at a first test point. The infrared light is turned on with a setting (e.g., a), producing an initial intensity (e.g., Ia). Luminance statistics data for first test point are obtained from the DSP (e.g., the measurement Ma) resulting from the infrared light intensity Ia. In the step 358, a second exposure measurement (e.g., Mb) is made at a second test point. The infrared light is turned on with a different setting (e.g., b), producing a different intensity of the infrared light (e.g., Ib). For example, the intensity using the setting b may be higher than the intensity using the setting a. Luminance statistics data for the second test point are obtained from the DSP (e.g., the measurement Mb) resulting from the infrared light intensity Ib.

If the ambient light level does not change during the infrared light intensity test points, how high the infrared light intensity should be set may be calculated (e.g., extrapolated, interpolated, etc.) from the values Ia and Ib, and the measurements Ma and Mb. In the step 360, an infrared light intensity function is calculated from the values Ia, Ma, Ib, Mb. In the step 362, an estimated infrared light intensity (e.g., Ic) for producing a desired frame illumination result (e.g., Mc) may be determined using the function determined in the step 360 (e.g., Ic=Mc*F(Ia, Ma, Ib, Mb)). For a linear system, a value c for setting the infrared light intensity Ic to obtain the correctly exposed (e.g., neither underexposed nor overexposed) frame may be calculated using the function and the values a and b. With the ideal infrared light intensity set to c, the measurement result of c (e.g., Mc) may be checked using luma statistics from the DSP to show whether the exposure is correctly set.

The processor circuits 104 and/or 302 may implement a control loop that utilizes a feedback loop to decide the final infrared light intensity setting c, because if the Mc (measurement results) shows the frame is still underexposed or overexposed, the difference may be fed back into the control loop, to either increase or decrease the setting c until an acceptable exposure balance point is found, which is the final infrared light intensity (e.g., Id).

The lens aperture and focal length distance of a camera, and also a gain of the sensor, may be adjusted to ensure the infrared light pulse provides the majority of the light collected (integrated) by the global shutter CMOS sensor. As described above, the best infrared light to set the desired exposure may be chosen using the ambient light level information. In practice, when the ambient light is very strong (e.g., at noon in daylight) there is no need to turn on the infrared light to capture a clear image of a fast moving object. In dimmer conditions (e.g., evening), when the ambient light level happens to be brighter than usual (e.g., there are strong road lights nearby), a smaller lens aperture can be used so the contribution of the ambient light to the CMOS sensor exposure will be smaller, and a stronger infrared light pulse may be used to obtain the correct exposure. In some embodiments, a mechanism (e.g., P-Iris, or DC-iris with Hall sensor) may be used to adjust the aperture of the lens on the fly (e.g., dynamically in real time). For example, an aperture controlling process may be applied to the mechanism, together with the infrared light intensity adjustment.

Since the ambient light level may change over time, the infrared illumination may also be periodically paused for a few frames, and the ambient light measured again using the above techniques. In one example, the infrared illumination setting d may be gradually adjusted to obtain the ideal infrared light intensity Id. In embodiments of the invention implemented in a vehicle, a scene may change much faster than in embodiments installed on a stationary object (e.g., a road light pole). In vehicle applications, the adjustment of infrared light intensity, and also the on-the-fly control of the lens aperture is generally advantageous.

Figure 6:
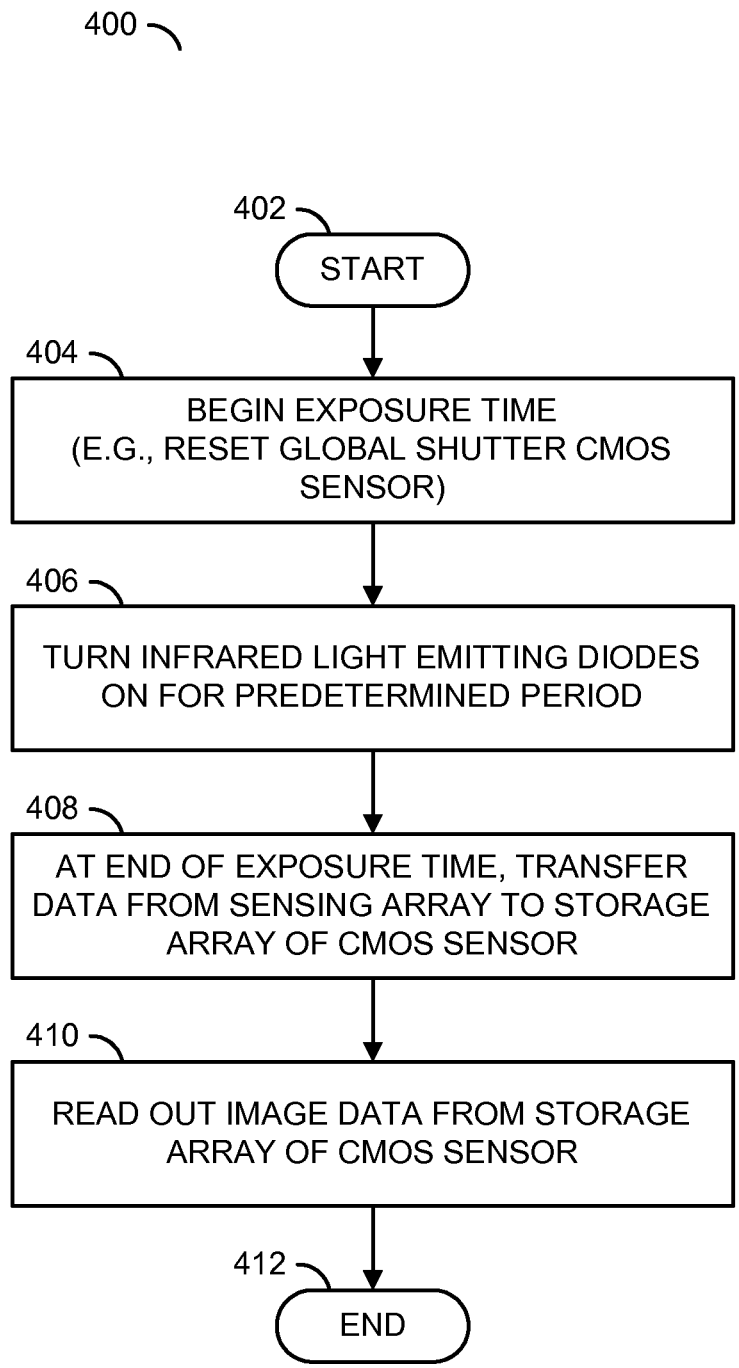
FIG. 6 is a flow diagram illustrating a process in accordance with an example embodiment of the invention.

Referring to FIG. 6, a flow diagram is shown illustrating an example process in accordance with an embodiment of the invention. In various embodiments, a process (or method) 400 may be implemented to capture images in low ambient light conditions. The method 400 generally comprises a step (or state) 402, a step (or state) 404, a step (or state) 406, a step (or state) 408, a step (or state) 410, and a step (or state) 412.

The step 402 may start the method 400. In the step 404, the process 400 begins the exposure time by initializing or resetting the image sensor of the camera (e.g., the signal GLOBAL SHUTTER in FIG. 1 above). In the step 406, the process 400 turns on the infrared illumination (e.g., by pulsing a determined number of IR LEDs) for a determined time period. In the step 408, the process 400 ends the exposure time and transfers data from the sensing elements (e.g., pixels) to storage elements associated with each sensing element. In the step 410, the process 400 reads out the image data from the storage elements (e.g., row by row, etc.). Next, the method 400 completes a cycle by moving to the end step 412. The process 400 is generally repeated for each frame of a video sequence.

Figure 7:
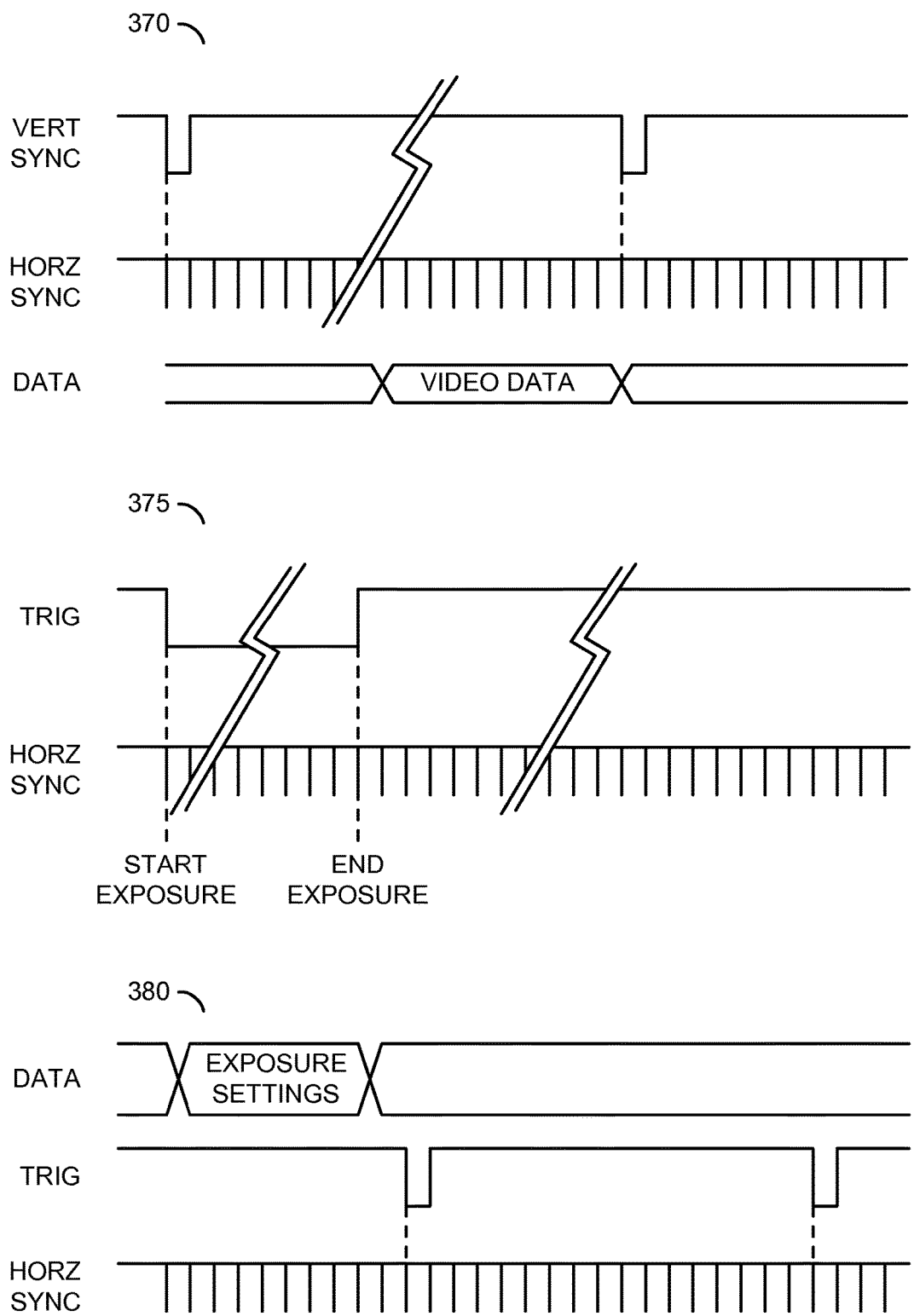
FIG. 7 is a diagram illustrating example implementations of an image sensor interface.

Referring to FIG. 7, a diagram is shown illustrating example implementations of a variety of image sensor interfaces. The example interfaces in FIG. 7 are illustrative and are not to be construed as intended to limit the manner in which the processor and image sensor may be coupled or communicate. In some embodiments, an interface 370 may be implemented between a processor and the CMOS image sensor. The interface 370 may comprise a vertical synchronization signal (e.g., VERT SYNC), a horizontal synchronization signal (e.g., HORZ SYNC), and a video data path. The signal VERT SYNC may be used to trigger a transfer of the image data from the pixel elements to the associated memory elements of the image sensor. The signal HORZ SYNC may be used to clock out the image data as a signal VIDEO DATA. A delay between assertion of the signal VERT SYNC and the beginning of the signal VIDEO DATA is generally determined by a design of the sensor. In embodiments implementing the interface 370, the exposure start is determined by the video modes, blanking periods, and related delays. The timing of the exposure window may be calculated from a timing diagram of the particular sensor and the IR illumination timed to occur after the exposure start time and within the exposure window.

In some embodiments, an interface 375 may be implemented between the processor and the CMOS image sensor. The interface 375 may comprise an exposure trigger signal (e.g., TRIG), a horizontal synchronization signal (e.g., HORZ SYNC), and a video data path (not shown). The signal TRIG may be used to control the length of the exposure window of the CMOS sensor and trigger a transfer of the image data from the pixel elements to the associated memory elements of the image sensor. When the signal TRIG is asserted (e.g., switched to a LOW state), the exposure window starts and the CMOS image sensor begins integration of the incident light. When the signal TRIG is de-asserted (e.g., switched to a HIGH state), the exposure window ends and the CMOS image sensor transfers the image data from the pixel elements to the storage elements. Similar to the interface 370, the signal HORZ SYNC may be used to clock out the image data as the signal VIDEO DATA. A delay between the signal TRIG being de-asserted and the beginning of the signal VIDEO DATA is generally determined by a design of the sensor. In embodiments implementing the interface 375, the exposure start and exposure window are determined by the signal TRIG. In some embodiments, the exposure window and IR illumination window may be set by configuration values stored in registers and/or configuration bits. The processor can implement control logic (e.g., software, firmware, circuitry) to calculate the timing of the IR pulse to be synchronized with the signal TRIG. For example, the processor may use a first GPIO to control the integration on/off and a second GPIO to control the IR illumination on/off. In embodiments implementing the interface 375, the processor may implement real-time control for each frame.

In some embodiments, an interface 380 may be implemented between the processor and the CMOS image sensor. The interface 380 may comprise an exposure setting data path, an exposure trigger signal (e.g., TRIG), a horizontal synchronization signal (e.g., HORZ SYNC), and a video data path (not shown). The exposure window duration may be programmed by data (e.g., EXPOSURE SETTINGS) communicated to the image sensor via the exposure setting data path. The signal TRIG may be used to control the start of the exposure window of the CMOS sensor. Transfer of the image data from the pixel elements to the associated memory elements of the image sensor is controlled by the image sensor based upon the EXPOSURE SETTINGS data. When the signal TRIG is asserted (e.g., switched to a LOW state), the exposure window starts and the CMOS image sensor begins integration of the incident light. When the predetermined exposure/integration time ends, the CMOS image sensor transfers the image data from the pixel elements to the storage elements. Similar to the interface 370, the signal HORZ SYNC may be used to clock out the image data from the storage elements as the signal VIDEO DATA. A delay between the signal TRIG being asserted and the beginning of the signal VIDEO DATA may be calculated based on the EXPOSURE SETTINGS data and a timing diagram of the sensor. In embodiments implementing the interface 380, the exposure start and exposure window are determined by the signals TRIG and EXPOSURE SETTINGS. The processor generally includes control logic (e.g., software, firmware, circuitry) to calculate the timing of the IR pulse to be synchronized with the signal TRIG. For example, the processor may use a first GPIO or SIO to program the integration duration, a second GPIO to control assertion of the signal TRIG, the and a third GPIO to control the IR illumination on/off.

Figure 8:
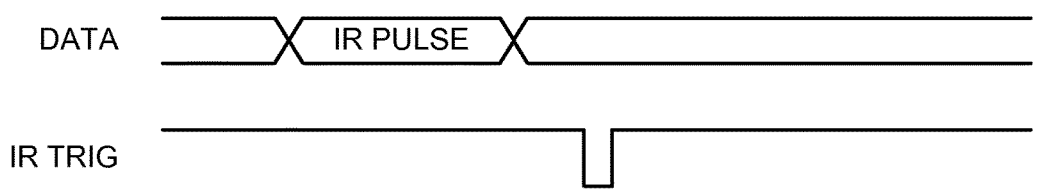
FIG. 8 is a diagram illustrating example implementations of an IR LED interface.
Figure 8:
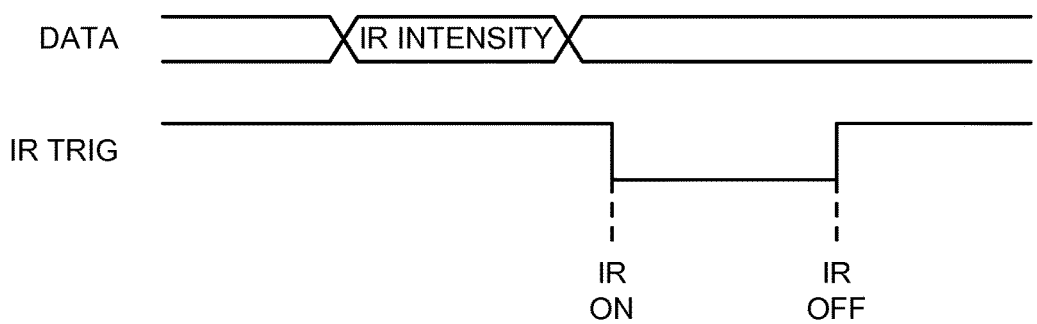

Referring to FIG. 8, a diagram is shown illustrating example implementations of a variety of IR LED interfaces. The example interfaces in FIG. 8 are illustrative and are not to be construed as intended to limit the manner in which the processor and IR LED module may be coupled or communicate.

In some embodiments, an interface 385 may be implemented between the processor and the IR LED module. The interface 385 may comprise an IR pulse setting data path and an IR pulse trigger signal (e.g., IR TRIG). The duration of the infrared illumination window 332 and the pulse intensity may be programmed by data (e.g., IR PULSE) communicated to the IR LED module via the IR pulse setting data path. The signal IR TRIG may be used to control the start of the IR light pulse. When the signal IR TRIG is asserted (e.g., switched to a LOW state), the IR pulse window starts and the predetermined number of IR LEDs are switched on to emit infrared light. When the predetermined IR pulse window time ends the predetermined number of IR LEDs are switched off. The processor generally includes control logic (e.g., software, firmware, circuitry) to calculate the timing of the IR pulse to be synchronized with the exposure window of the CMOS image sensor. For example, the processor may use a first GPIO or SIO (serial input/output) to program the IR pulse duration and intensity, and a second GPIO to control assertion of the signal IR TRIG.

In some embodiments, an interface 390 may be implemented between the processor and the IR LED module. The interface 390 may comprise an IR pulse setting data path and an IR pulse trigger signal (e.g., IR TRIG). The intensity (e.g., number of IR LEDs turned on) of the IR light pulse may be programmed by data (e.g., IR INTENSITY) communicated to the IR LED module via the IR pulse setting data path. The signal IR TRIG may be used to control the start and duration of the IR light pulse. When the signal IR TRIG is asserted (e.g., switched to a LOW state), the IR pulse window starts and the predetermined number of IR LEDs are switched on to emit infrared light. When the signal IR TRIG is de-asserted (e.g., switched to a HIGH state), the IR pulse window ends and the predetermined number of IR LEDs are switched off. The processor generally includes control logic (e.g., software, firmware, circuitry) to calculate the timing of the IR pulse to be synchronized with the exposure window of the CMOS image sensor. For example, the processor may use a first GPIO or SIO to program the IR pulse intensity, and a second GPIO to control assertion of the signal IR TRIG to control the IR illumination on/off.

Figure 9:
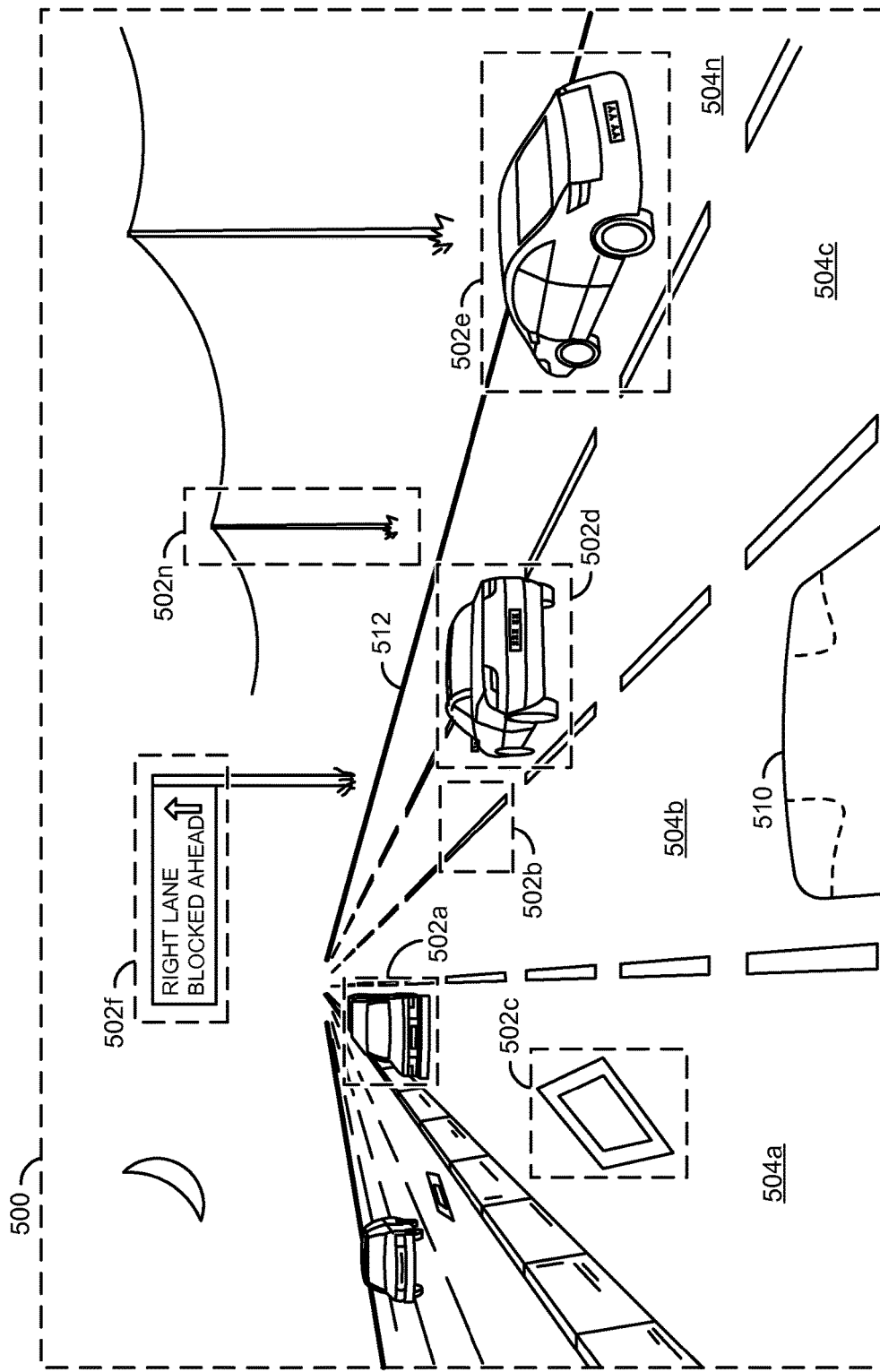
FIG. 9 is a diagram illustrating objects being detected in a video frame by a vehicle mounted night vision capable camera.

Referring to FIG. 9, a diagram illustrating a video frame 500 is shown. The frame 500 may be one of a number of frames of a video sequence captured by a camera (e.g., the camera 100 and/or 300) mounted to a vehicle 510. The frame 500 is shown having a number of objects 502a-502n. The objects 502a-502n are shown in and/or out of a number of lanes 504a-504n. The vehicle 510 is shown moving in a lane 504b. The video frame 500 is generally illustrative of a perspective of a driver (e.g., a targeted view from the vehicle 510).

The objects 502a-502n represent objects that may be detected and/or classified within the frame 500. For example, the object 502a may represent an automobile in the lane 504a. The object 502b may represent the marker (e.g., a lane divider) between the lane 504b and the lane 504c. The object 502c may represent a lane marking in the lane 504a (e.g., a high-occupancy vehicle (HOV) lane marker). The object 502d may represent an automobile traveling in the lane 504c. The object 502e may represent a car traveling in the lane 504n. The object 502f may represent a sign along a road 512. The object 502n may represent a utility pole outside of all of the lanes 504a-504n. Other types of objects may comprise pylons, road cones, barriers, etc. The number and/or types of objects 502a-502n detected may be varied according to the design criteria of a particular implementation.

In one example, the camera device mounted in the vehicle 510 may be configured to capture images of moving objects (e.g., the license plate of the car 502d, the text of the sign 502f, etc.) in low ambient light conditions and perform optical character recognition (OCR). To facilitate OCR of the various objects, the camera mounted in the vehicle 510 may be configured to illuminate the objects 502a-502n with pulses of infrared light in order to reduce effects related to the low ambient light and/or relative motion between the vehicle 510 and the objects 502a-502n. In some embodiments, a region of interest (ROI) capability of the CMOS sensor may be utilized to crop the images to the particular objects of interest.

The processor 108 and/or 302 may be configured to determine the timing and lighting needed to discern the objects 502a-502n in the frame 500. In one example, the processor 108 and/or 302 may be configured to calculate locations of the objects 502a-502n in the frame 500 to determine absolute coordinates of the objects 502a-502n. The processor 108 and/or 302 may be further configured to determine a size of the detected objects 502a-502n in a frame. The size of the detected objects 502a-502n in the video frame 500 may be used to determine the absolute coordinates of the objects 502a-502n, to classify a type of the detected objects 502a-502n (e.g., vehicles, lane markers, road signs, etc.), and/or a condition of the detected objects 502a-502n (e.g., slow-moving, damaged, closed, etc.).

Figure 10:
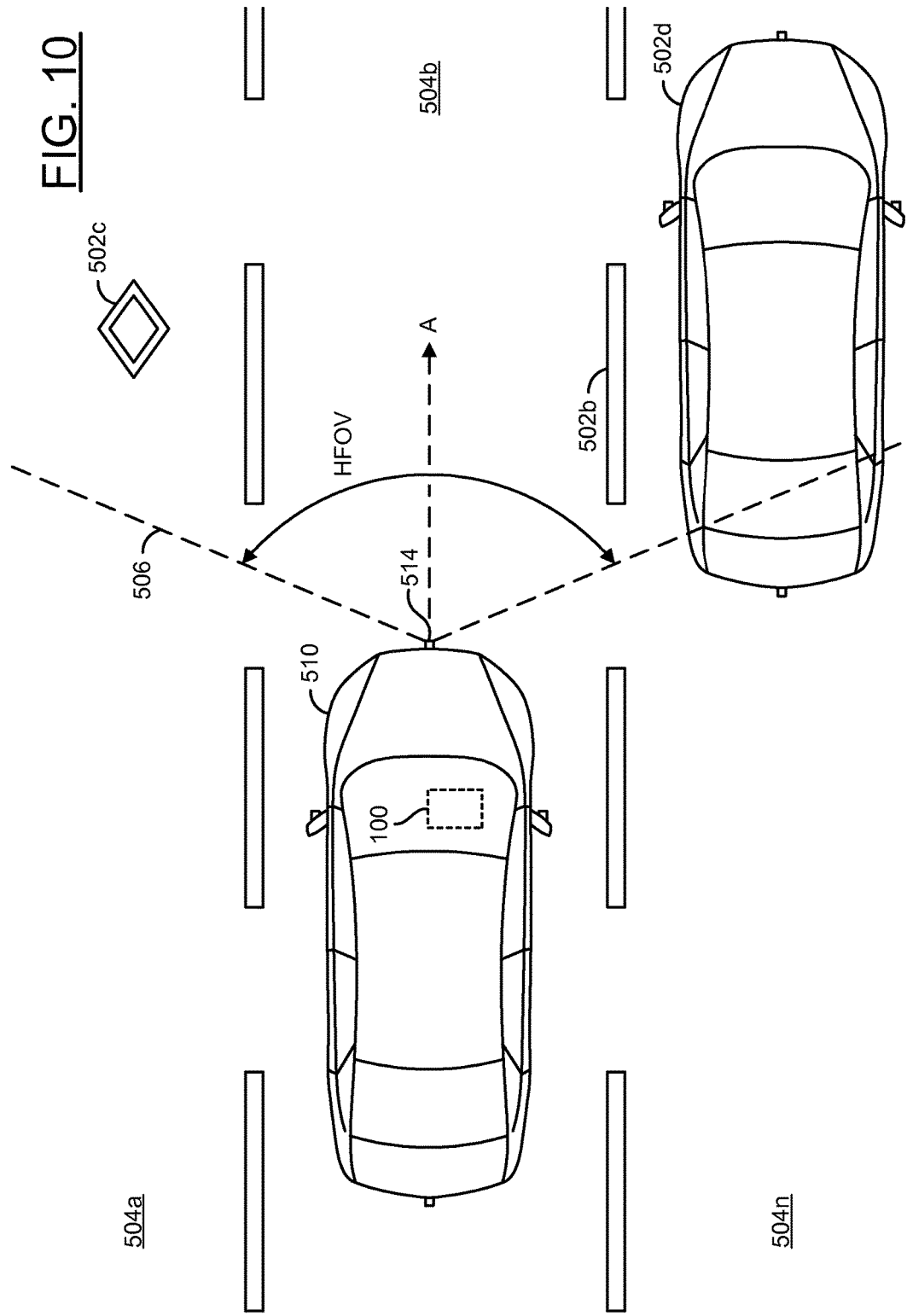
FIG. 10 is a diagram illustrating objects in a field of view of the camera of FIG. 9.

Referring to FIG. 10, a diagram illustrating objects in a field of view of the camera mounted on the vehicle 510 is shown. The vehicle 510 is shown traveling in the lane 504b. A lens 514 of the camera (e.g., a front-mounted lens) is shown having a field of view 506. The field of view 506 may provide the targeted view from the vehicle 510. The objects 502b, 502c and 502d are shown in the field of view 506 (e.g., the objects 502b, 502c and/or 502d may be detected by the camera device 100 and/or 300 mounted in vehicle 510). Status information and/or a video signal generated by the camera may comprise, for example, a value indicating the field of view 506 measured in degrees and/or radians (e.g., the measurement HFOV). In some embodiments, a similar value may be generated for a vertical measurement of the field of view 506 (e.g., a measurement VFOV).

Figure 11:
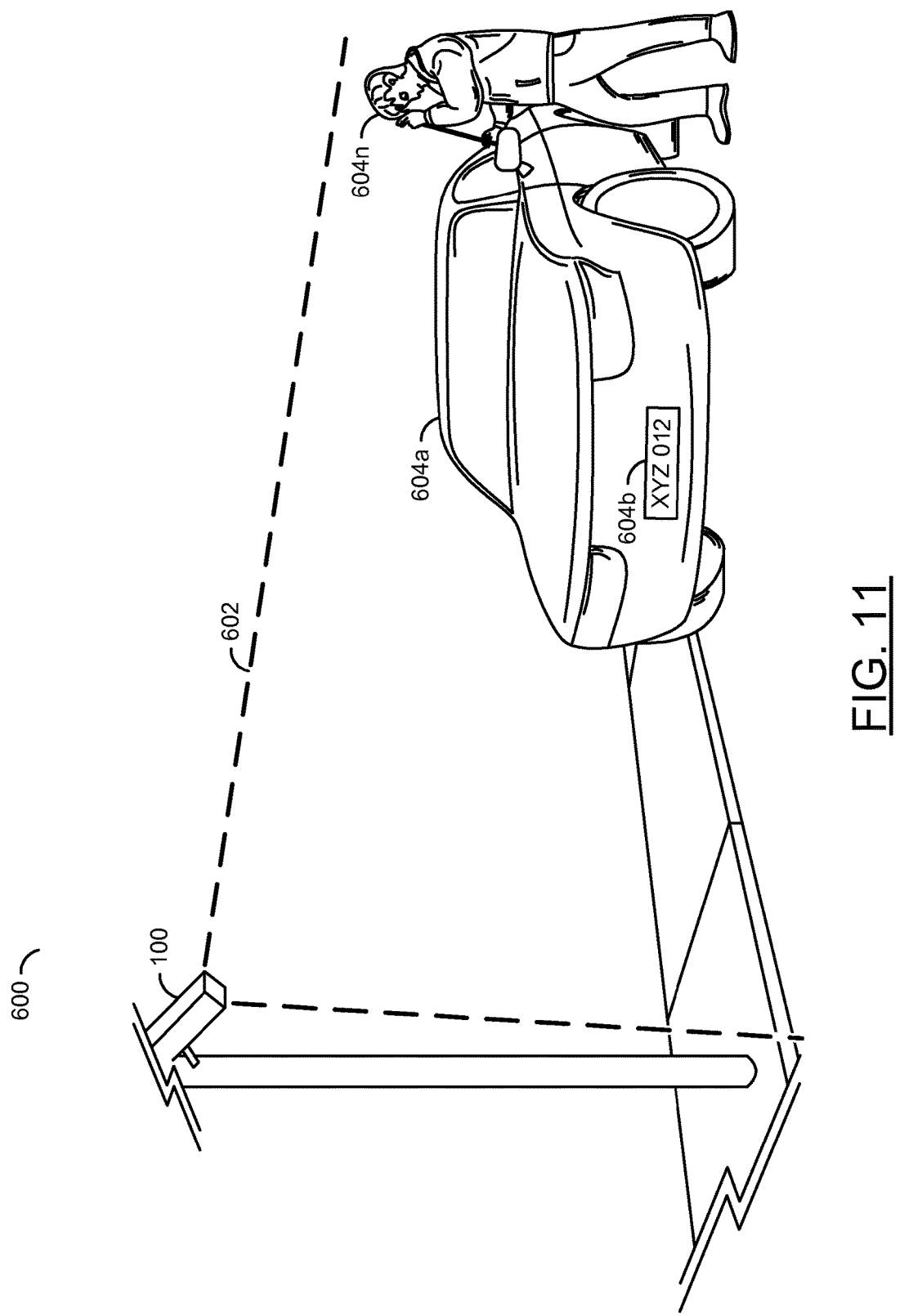
FIG. 11 is a diagram illustrating a camera system detecting objects.

Referring to FIG. 11, a diagram illustrating the camera system 100 utilized in a surveillance context is shown. The camera system 100 is shown installed at a high vantage point (e.g., on a street lamp post, a utility pole, etc.). The camera has a field of view 602. A number of objects 604a-604n are shown within the field of view 602. The object 604a may be a parked vehicle. The object 604b may be a license plate on the parked vehicle. The object 604n may be a person. The person 604n is shown attempting to enter into the vehicle 604a.

The field of view 602 is shown encompassing the detected objects 604a-604n. For example, the camera system 100 may capture the targeted view of the environment (e.g., the field of view 602). The video file corresponding to the targeted view of the environment may be analyzed (e.g., by the processor 108 or another processor external to the camera 100. The analysis may be configured to detect and identify the objects 604a-604n. Based on the field of view 602, a distance to the detected objects 604a-604n and/or absolute coordinates of the detected objects 604a-604n may be determined by the camera system 100. The camera system 100 may be located a distance (e.g., 10 feet or greater) away from the detected objects 604a-604n. Location information of the camera system 100 (e.g., GPS data) may be insufficient to determine an absolute location (or coordinates) of the detected objects 604a-604n (e.g., the location of the camera system 100 may be an insufficient proxy). The camera system 100 may determine a location of the camera system 100 relative to the detected objects 604a-604n. The camera system 100 is shown located above the detected objects 604a-604n and aimed in a relatively downwards direction. In one example, sensors within the camera system may determine an azimuth and/or angle of the camera system 100. Using the status information of the camera system 100 and/or information about the orientation of the camera system 100, an absolute location and/or absolute coordinates of the detected objects 604a-604n may be determined.

In some embodiments, the camera system 100 may be installed at a fixed location. For example, the status information of the camera system 100 may be pre-programmed in the camera system 100 based on the fixed location of the camera system 100. The camera system 100 may determine the orientation of the camera system 100 and/or the field of view 602 during operation to determine the location of the detected objects 604a-604n. In some embodiments, the camera system 100 may be installed for mobile use (e.g., a dash mounted camera on a vehicle, a wearable camera, a remotely piloted vehicle (drone) camera, etc.). For example, the status information may change as the camera system 100 is moved during operation.

In some embodiments, the camera system 100 may be configured to detect particular types of objects (e.g., vehicles, license plates, faces, animals, etc.). For example, the camera system 100 may be configured to detect stolen vehicles and/or be pre-programmed to store reference vehicles to allow the camera system 100 to quickly determine a make, model and/or year of the detected vehicle 604a. In another example, an online database may be implemented with information for various types of detected objects (e.g., a connection to the online database may be implemented, for example, via the wireless interface 116) and the information may be downloaded and stored in the camera system 100. The implementation of the camera system 100 and/or a method of storing information about the various types of potential detected objects may be varied according to the design criteria of a particular implementation.

The camera system 100 may be configured to capture video image data in low ambient light conditions (e.g., night vision applications) by pulsing infrared light emitting diodes to illuminate the field of view 602. In various embodiments, the image sensor 104 of the camera system 100 may receive light from the lens 102. The lens 102 may be directed, panned, zoomed and/or rotated to provide a targeted view of the environment (e.g., the field of view 602). The image sensor 104 may transform the received light into digital data (e.g., pixel values). In various embodiments, the image sensor 104 may perform an analog to digital conversion. For example, the image sensor 104 may perform a photoelectric conversion of the light received through the lens 102. The image sensor 104 may transfer the pixel values collected during an exposure window to a storage device array for subsequent conversion into video data, a video file and/or video frames (e.g., perform encoding). For example, the video data may be a digital video signal. The digital video signal may comprise video frames (e.g., sequential digital images). The video data of the targeted view of the environment (e.g., the field of view 602) may be represented as the signal/bitstream/data VIDEO (e.g., a digital video signal).

Figure 12:
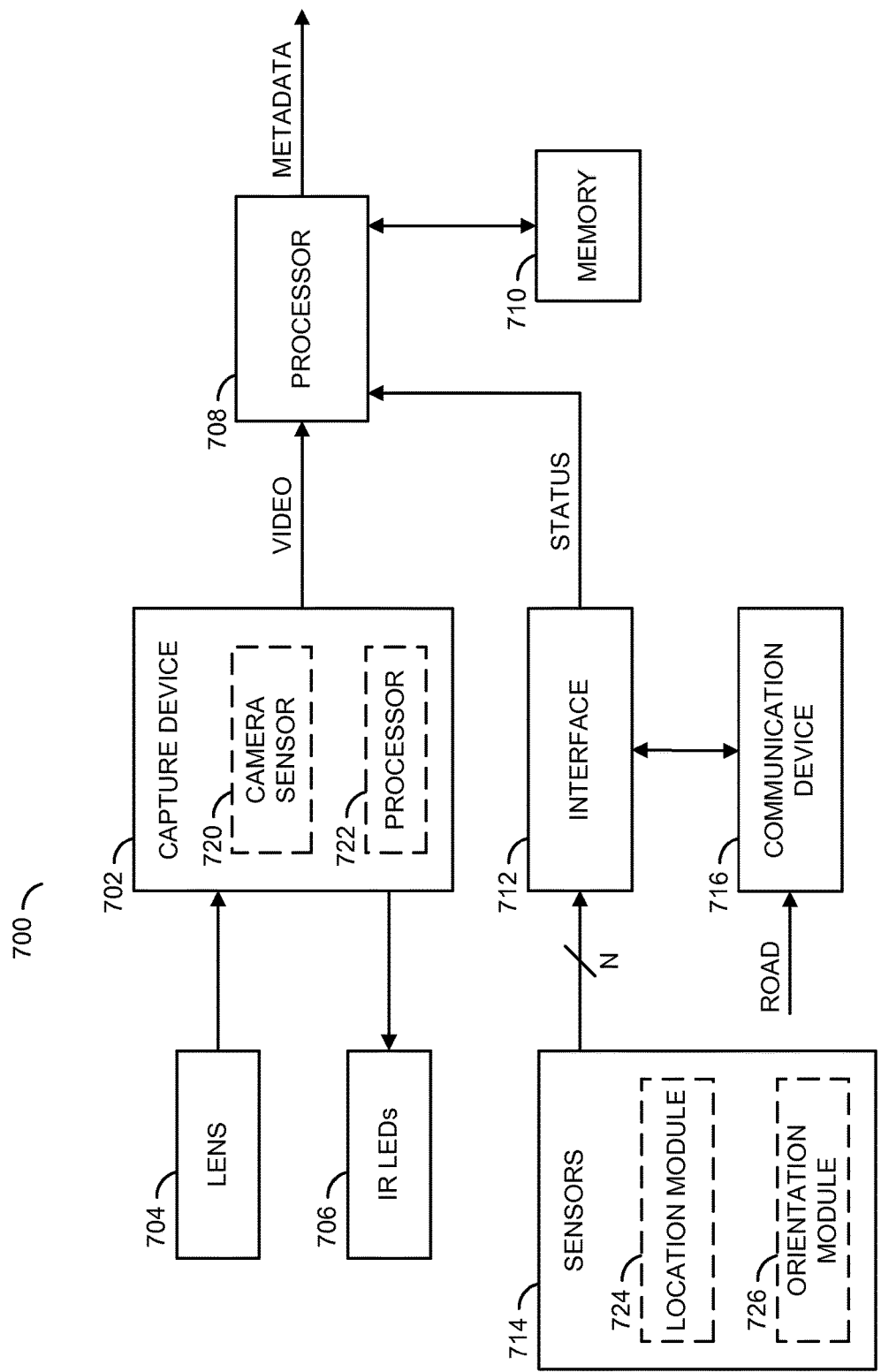
FIG. 12 is a diagram illustrating an apparatus in accordance with another example embodiment of the invention.

Referring to FIG. 12, a diagram of an apparatus 700 is shown in accordance with another example embodiment of the present invention. The apparatus 700 may implement a night vision camera device including a capture device 702, a lens 704, an infrared illumination module 706, a processor 708, a memory 710, a communication device 712, sensors 714, and/or a communication device 716. The camera device 700 may be a distributed system (e.g., each component may be implemented separately throughout an installation location such as a vehicle). The capture device 702 may comprise a block (or circuit) 720 and/or a block (or circuit) 722. The circuit 720 may be a global shutter CMOS sensor (e.g., a camera sensor separate from the sensors 714). The circuit 722 may be a processor (e.g., a processor separate from the processor 708). The capture device 702 may implement a separate internal memory (e.g., a memory separate from the memory 710). The sensors 714 may comprise a block (or circuit) 724 and/or a block (or circuit) 726. The circuit 724 may be a location module. In one example, the location module 724 may be configured as a GPS component. The circuit 726 may be an orientation module. In one example, the orientation module 726 may be configured as a magnetometer component. Other types of sensors may be implemented as components of the block 714.

The capture device 702 may present the signal VIDEO to the processor 708. The signal VIDEO may represent the video frames/video data. The signal VIDEO may be a video stream captured by the capture device 702. In some embodiments, the capture device 702 may be implemented in a camera. In some embodiments, the capture device 702 may be configured to add to existing functionality of a separate camera. In some embodiments, the capture device 702 may be pre-installed at a pre-determined location and the camera system 700 may connect to the capture device 702. In other embodiments, the capture device 702 may be part of the camera system 700 (e.g., implementing the image sensor 104. The capture device 702 may be configured for security monitoring. For example, the capture device 702 may be implemented to detect break-ins and/or vandalism. The capture device 702 may be configured to detect faces in a region of a video frame. The capture device 702 may be configured to recognize faces through facial recognition (e.g., based on faces stored in the memory 710). The camera system 700 may be configured to leverage pre-existing functionality of the pre-installed capture device 702. The implementation of the capture device 702 may be varied according to the design criteria of a particular implementation.

In some embodiments, the capture device 702 may implement a camera sensor 720 and a processor 722. The camera sensor 720 may receive light from the lens 704 and transform the light into digital data (e.g., the bitstream). For example, the camera sensor 720 may perform a photoelectric conversion of the light from the lens 704. The processor 722 may transform the bitstream into a human-legible content (e.g., video data). For example, the processor 722 may receive pure (e.g., raw) data from the camera sensor 720 and generate (e.g., encode) video data based on the raw data (e.g., the bitstream). The capture device 702 may have a memory to store the raw data and/or the processed bitstream. For example, the capture device 702 may implement a frame memory and/or buffer to store (e.g., provide temporary storage and/or cache) one or more of the video frames (e.g., the digital video signal). The processor 722 may perform analysis on the video frames stored in the memory/buffer of the capture device 702.

In some embodiments the capture device 702 may be configured to determine a location of the detected objects 604a-604n. For example, the processor 722 may analyze the captured bitstream (e.g., using machine vision processing), determine a location of the detected objects 604a-604n and present the signal VIDEO (e.g., comprising information about the location of the detected objects 604a-604n) to the processor 708. In another example, the processor 722 may generate the signal VIDEO comprising video frames and the processor 708 may analyze the video frames to determine the location of the detected objects 604a-604n (e.g., more analysis is performed by the processor 708). The analysis performed by the processor 722 and/or the processor 708 may be varied according to the design criteria of a particular implementation.

In some embodiments, the processor 722 may be implemented as a local processor for the camera system 700 and the processor 708 may be implemented as an external processor. The processor 722 may be configured to combine the signal VIDEO and the signal STATUS for storage in the memory 710 (e.g., embed the status information in the video file as a text track, control channel, RTP stream, etc.). The camera system 700 may be configured to transmit the signal VIDEO with embedded status information to a database. The external processor 708 may be configured to perform the detection of the objects 604a-604n, the determination of the absolute coordinates of the detected objects 604a-604n, the generation of metadata information (e.g., METADATA) and/or comparisons with information from external sources.

The interface 712 may receive data from one or more of the sensors 714. The signal STATUS may be generated in response to the data received from the sensors 714 at a time of generation of the signal VIDEO. The sensors 714 may include, but are not limited to, a location module 724 and an orientation module 726. In some embodiments, the interface 712 may receive data from a location module 724. In some embodiments, the interface 712 may receive data from the orientation module 726. In some embodiments, the interface 712 may receive data from the processor 708 and/or the communication device 716. The interface 712 may send data (e.g., instructions) from the processor 708 to connected devices via the communications device 716. For example, the interface 712 may be bi-directional. In one example, where the camera system 700 is installed in a vehicle, the interface 712 may be implemented as an electronic bus (e.g., a controller area network (CAN) bus) and the sensors 714 may be part of the vehicle. In another example, the interface 712 may be implemented as an Ethernet interface. In yet another example, the interface 712 may be implemented as an electronic device (e.g., a chip) with a CAN bus controller. In some embodiments, the sensors 714 may connect directly to the processor 708 (e.g., the processor 708 may implement a CAN bus controller for compatibility, the processor 708 may implement a serial peripheral interface (SPI), the processor 708 may implement another interface, etc.). In some embodiments, the sensors 714 may connect to the memory 710.

The processor 708 may be configured to execute computer readable code and/or process information. The processor 708 may be configured to receive input and/or present output to the memory 710. The processor 708 may be configured to present and/or receive other signals (not shown). The number and/or types of inputs and/or outputs of the processor 708 may be varied according to the design criteria of a particular implementation.

In some embodiments, the processor 708 may receive the signal VIDEO from the capture device 702 and detect the objects 604a-604n in the video frame. In some embodiments, the processor 722 may be configured to detect the objects 604a-604n and the processor 708 may receive the location (or coordinates) of detected objects 604a-604n in the video frame from the capture device 702. In some embodiments, the processor 708 may be configured to analyze the video frame (e.g., the signal VIDEO). The processor 708 may be configured to detect a location and/or position of the detected objects 604a-604n in the video frame. The processor 708 may determine a distance of the detected objects 604a-604n from the camera (e.g., the lens 704) based on information from the signal STATUS. In some embodiments, the processor 708 may receive the location (or coordinates) of the detected objects 604a-604n from the capture device 702 and distance of the detected objects 604a-604n from the sensors 714 through the interfaces 712. The information received by the processor 708 and/or the analysis performed by the processor 708 may be varied according to the design criteria of a particular implementation.

Based on the distance and/or location of the detected objects 604a-604n in the video frame (e.g., the signal VIDEO), the processor 708 may determine the absolute location and/or the absolute coordinates of the detected objects 604a-604n. The absolute coordinates of the detected objects 604a-604n may be based on the signal VIDEO and/or the signal STATUS. The processor 708 may generate the signal METADATA in response to the determined absolute position of the detected objects 604a-604n.

The signal METADATA may be implemented to provide searchable data (e.g., tags) corresponding to the video file. For example, the signal METADATA may be stored in the searchable database. In another example, the signal METADATA may be stored in the memory 710. Generally, the signal METADATA is searchable. Generally the signal METADATA may correspond to a location of the detected objects 604a-604n. The utilization of the data stored in the signal METADATA may be varied according to the design criteria of a particular implementation. In some embodiments, the signal METADATA may be presented to the communication device 716 and the communication device 716 may pass the signal METADATA to an external network and/or external storage.

The processor 708 and/or the processor 722 may be implemented as an application specific integrated circuit (e.g., ASIC) or a system-on-a-chip (e.g., SOC). The processor 708 and/or the processor 722 may be configured to determine a current size of the detected objects 604a-604n (e.g., an object having a reference size). The processor 708 and/or the processor 722 may detect one or more of the detected objects 604a-604n in each video frame. The processor 708 and/or the processor 722 may determine a number of pixels (e.g., a width, a height and/or a depth) comprising the detected objects 604a-604n in the video frame. Based on the number of pixels of each of the detected objects 604a-604n in the video frame, the processor 708 and/or the processor 722 may estimate a distance of the detected objects 604a-604n from the lens 704. Whether the detection of the objects 604a-604n is performed by the processor 708 and/or the processor 722 may be varied according to the design criteria of a particular implementation.

The memory 710 may store data. The memory 710 may be implemented as a cache, flash memory, DRAM memory, etc. The type and/or size of the memory 710 may be varied according to the design criteria of a particular implementation. The data stored in the memory 710 may correspond to the detected objects 604a-604n, reference objects, the video file and/or the metadata information. For example, the memory 710 may store a reference size (e.g., the number of pixels of an object of known size in a video frame at a known distance) of the objects 604a-604n. The reference size stored in the memory 710 may be used to compare the current size of the detected objects 604a-604n in a current video frame. The comparison of the size of the detected objects 604a-604n in the current video frame and the reference size may be used to estimate a distance of the objects 604a-604n from the lens 704.

The memory 710 may store the pre-determined location of the camera system 100 and/or a pre-determined field of view 602 of the camera system 700 (e.g., when the camera system 700 is implemented as a fixed view security camera). For example, the status information of the camera system 700 may be updated by over-writing the status information stored in the memory 710.

The communication device 716 may send and/or receive data to/from the interface 712. In some embodiments, when the camera system 100 is implemented as a vehicle camera, the communication device 716 may be the OBD of the vehicle. In some embodiments, the communication device 716 may be implemented as a satellite (e.g., a satellite connection to a proprietary system). In one example, the communication device 716 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lens 704 (e.g., a camera lens) may be directed to provide a targeted view of the environment (e.g., the field of view 602). In one example, the lens 704 may be mounted on a dashboard of a vehicle. In another example, the lens 704 may be part of a wearable camera (e.g., a camera worn by a police officer, a camera worn by an athlete, a camera worn by a first responder, a camera worn by a thrill-seeker, etc.). The lens 704 may be aimed to capture environmental data (e.g., light). The lens 704 may be configured to capture and/or focus the light for the capture device 702. Generally, the camera sensor 720 is located behind the lens 704. Based on the captured light from the lens 704, the capture device 702 may generate a bitstream and/or video data.

The sensors 714 may be configured to determine a location and/or orientation of the camera system 700. The number and/or types of data used to determine the location and/or orientation of the camera system 700 may be varied according to the design criteria of a particular implementation. In one example, the location module 724 may be used to determine an absolute location of the camera system 700. In another example, the orientation module 726 may be used to determine an orientation of the camera system 700. Generally, information from the sensors 714 may be an insufficient proxy for the absolute location and/or absolute coordinates of the detected objects 604a-604n. Data from the sensors 714 may be presented to the processor 708 as the signal STATUS. In some embodiments, the data from the sensors 714 may be part of the metadata contained in the signal METADATA.

The sensors 714 (e.g., the location module 724, the orientation module 726 and/or any other types of sensors) may be configured to determine an absolute location and/or an azimuth orientation of the camera system 700. The absolute location and/or the azimuth orientation of the camera system 700 may be added to the relative location of the detected objects 604a-604n to determine an absolute location (e.g., coordinates) of the detected objects 604a-604n.

The signal STATUS may provide location information and/or orientation information for the camera system 700 (e.g., the status information). The location information may be determined by the location module 724. For example, the location module 724 may be implemented as a GPS sensor. The orientation information may be determined by the orientation module 726. For example, the orientation module 726 may be implemented as a magnetometer, an accelerometer and/or a gyroscope. The types of sensors used to implement the location module 724 and/or the orientation module 726 may be varied according to the design criteria of a particular implementation. In some embodiments, the signal STATUS may provide details about the camera system 100 (e.g., camera specifications, camera identity, the field of view 602, date, time, etc.).

Figure 13:
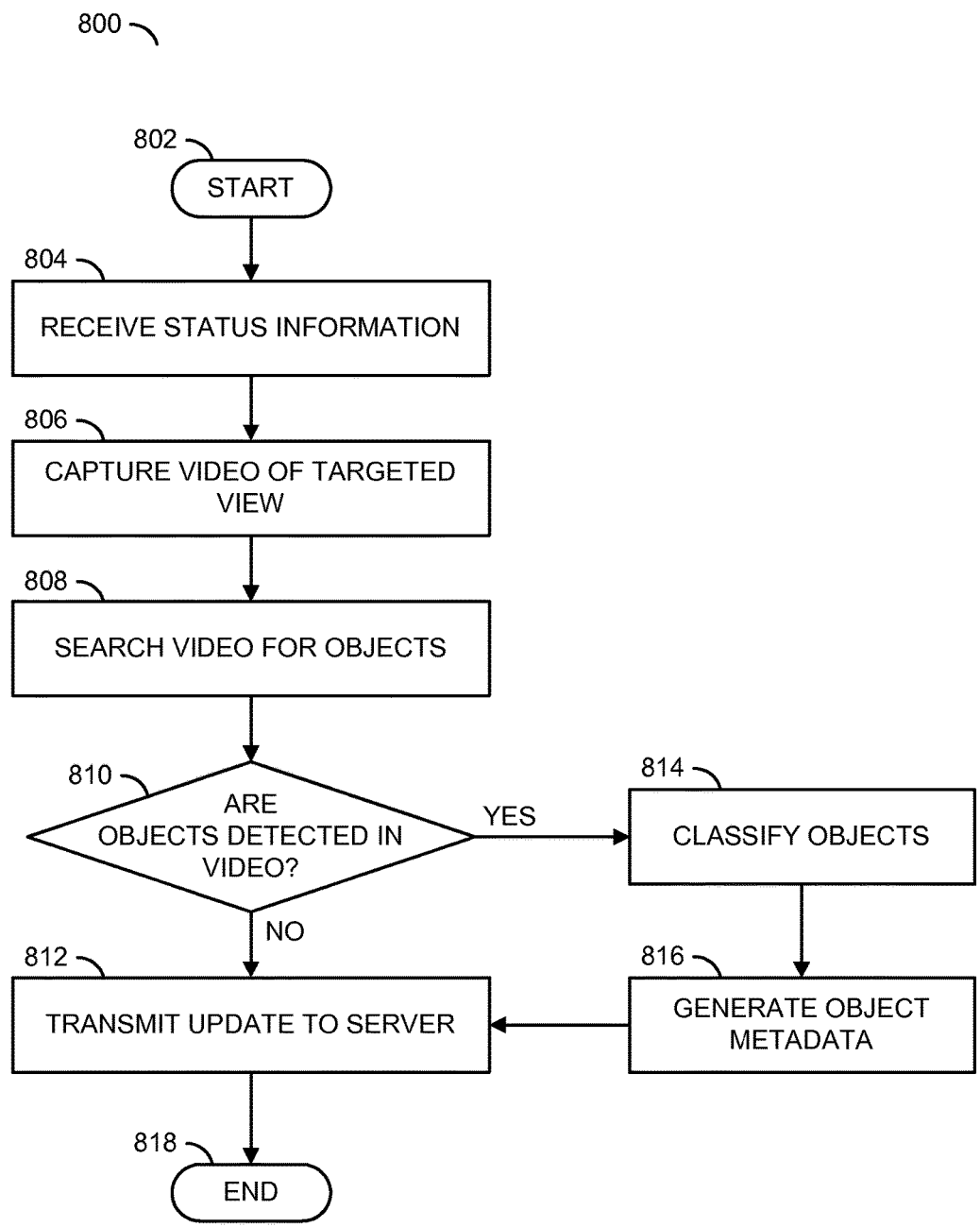
FIG. 13 is a flow diagram illustrating a method for classifying detected objects and generating metadata.

Referring to FIG. 13, a method (or process) 800 is shown. The method 800 may classify objects detected using a night vision camera and generate metadata in accordance with an embodiment of the invention. The method 800 generally comprises a step (or state) 802, a step (or state) 804, a step (or state) 806, a step (or state) 808, a decision step (or state) 810, a step (or state) 812, a step (or state) 814, a step (or state) 816, and a step (or state) 818.

The step 802 may start the method 800. The step 804 may receive status information from the camera (e.g., the signal STATUS in FIG. 12 above). The step 806 may capture video of a targeted view (e.g., the frame 500). The step 808 may search the video for the objects 502a-502n. The decision step 810 may determine if there are objects detected in the video. If not, the method 800 moves to the step 812. If the decision step 810 determines that objects are detected in the video, the method 800 moves to the step 814. The step 814 classifies the detected objects 502a-502n. Step 816 generates object metadata (e.g., the signal METADATA), then moves to the step 812. The step 812 transmits the updates to a server. Next, the method 800 moves to the end step 818.

The various signals of the present invention are generally "on" (e.g., a digital LOW, or 0) or "off" (e.g., a digital HIGH, or 1). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

The functions performed by the diagrams of FIGS. 5, 6, and 13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a complementary metal oxide semiconductor (CMOS) image sensor comprising a plurality of picture elements, wherein light integration begins on all of said picture elements simultaneously in response to a first control signal;
   an infrared light generating circuit, wherein a duration, an intensity, or both a duration and an intensity of infrared illumination generated by said infrared light generating circuit is controlled by a second control signal; and
   a processor circuit enabled to generate said first control signal and said second control signal, wherein a period of said infrared illumination is shorter than an integration period of said CMOS image sensor.

2. The apparatus according to claim 1, wherein said plurality of picture elements of said CMOS image sensor are arranged in a two-dimensional array.

3. The apparatus according to claim 1, wherein said plurality of picture elements of said CMOS image sensor are reset simultaneously in response to said first control signal.

4. The apparatus according to claim 1, wherein said CMOS image sensor comprises a global shutter CMOS image sensor.

5. The apparatus according to claim 1, wherein said second control signal determines an infrared light emitting window of said infrared light generating circuit.

6. The apparatus according to claim 5, wherein said infrared light generating circuit comprises a plurality of light emitting diodes.

7. The apparatus according to claim 6, wherein said second control signal further determines how many of said light emitting diodes are turned on during said infrared light emitting window.

8. The apparatus according to claim 1, wherein said processor circuit is further configured to determine an ambient light level.

9. The apparatus according to claim 8, wherein said processor circuit is further configured to generate said second control signal based on the determined ambient light level.

10. The apparatus according to claim 1, wherein said processor circuit is further configured to:
    start an integration period of said CMOS image sensor by asserting said first control signal;
    generate a pulsed infrared illumination using said second control signal;
    readout image data from said CMOS image sensor when said integration period of said CMOS image sensor ends; and
    detect one or more objects contained in said image data by applying one or more image processing techniques to said image data.

11. The apparatus according to claim 10, wherein said processor circuit is further configured to reduce motion-related distortion of said image data by adjusting a duration of said pulsed infrared illumination based on an ambient light level.

12. The apparatus according to claim 1, wherein said CMOS image sensor, said infrared light generating circuit, and said processor circuit implement a video camera.

13. The apparatus according to claim 12, wherein said video camera has night vision capability and is mountable in a vehicle.

14. A method of capturing video images in low ambient light comprising the steps of:
    starting an integration period of a CMOS image sensor by asserting a first control signal, wherein said CMOS image sensor comprises a plurality of picture elements and light integration begins on all of said picture elements simultaneously in response to said first control signal; and generating an infrared illumination using a second control signal to control one or more of a plurality of light emitting diodes, wherein a duration, an intensity, or both a duration and an intensity of said infrared illumination is controlled by said second control signal, and a period of said infrared illumination is shorter than said integration period of said CMOS image sensor.

15. The method according to claim 14, further comprising:

reading out image data from said CMOS image sensor when said integration period of said CMOS image sensor ends.

16. The method according to claim 15, further comprising:

detecting one or more objects contained in said image data by applying one or more image processing techniques to said image data using at least one of a video digital signal processing circuit or an image digital processing circuit.

17. The method according to claim 14, wherein generating said infrared illumination comprises:

generating pulses of infrared light by using said second control signal to pulse said one or more of said plurality of light emitting diodes during said integration period of said CMOS image sensor.

18. The method according to claim 17, further comprising:

adjusting a duration of said pulses of infrared light based on an ambient light level to reduce motion-related distortion of image data read from said CMOS image sensor.

19. The method according to claim 18, further comprising:

determining said ambient light level; and generating said second control signal based on the determined ambient light level.

20. The method according to claim 19, wherein said second control signal determines how many of said plurality of light emitting diodes are turned on during an infrared light emitting window.

* * * * *